United States Patent
Shveidel et al.

(10) Patent No.: US 11,347,725 B2
(45) Date of Patent: May 31, 2022

(54) EFFICIENT HANDLING OF HIGHLY AMORTIZED METADATA PAGE UPDATES IN STORAGE CLUSTERS WITH DELTA LOG-BASED ARCHITECTURES

(71) Applicant: EMC IP Holding Company LLC, Hopkinton, MA (US)

(72) Inventors: Vladimir Shveidel, Pardes-Hana (IL); Daniel Krauthgamer, Ramat Hasharon (IL); Adi Katzengold, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 225 days.

(21) Appl. No.: 16/742,076

(22) Filed: Jan. 14, 2020

(65) Prior Publication Data
US 2021/0216531 A1    Jul. 15, 2021

(51) Int. Cl.
 *G06F 16/23* (2019.01)
(52) U.S. Cl.
 CPC ...... *G06F 16/2379* (2019.01); *G06F 16/2365* (2019.01)
(58) Field of Classification Search
 CPC ... G06F 16/2365; G06F 16/2379; G06F 16/23
 USPC ........................................................ 707/703
 See application file for complete search history.

(56) References Cited

U.S. PATENT DOCUMENTS

| 6,163,856 A * | 12/2000 | Dion | ............ G06F 11/2064 709/213 |
| 6,732,124 B1 * | 5/2004 | Koseki | ............ G06F 11/1435 |
| 9,311,333 B1 | 4/2016 | Pawar et al. | |
| 9,442,941 B1 | 9/2016 | Luz et al. | |
| 10,101,934 B1 | 10/2018 | Ben-Moshe et al. | |
| 10,372,560 B2 | 8/2019 | Danilov et al. | |
| 10,491,490 B2 * | 11/2019 | Sridhar | ............ H04L 41/5006 |
| 10,496,601 B1 | 12/2019 | Natanzon | |
| 2012/0151118 A1 * | 6/2012 | Flynn | ............ G06F 11/1441 711/6 |

(Continued)

OTHER PUBLICATIONS

Shveidel, et al.; "System and Method for Aggregating Metadata Changes in a Storage System," U.S. Appl. No. 16/260,660, filed Jan. 29, 2019.

*Primary Examiner* — James Trujillo
*Assistant Examiner* — Fariborz Khoshnoodi
(74) *Attorney, Agent, or Firm* — BainwoodHuang

(57) ABSTRACT

Techniques for handling highly amortized metadata page updates in storage clusters with delta log-based architectures. In response to performance of a transaction commit operation, bulk metadata pages are written in a transactional area of persistent memory in association with a unique transaction identifier. Further, raw delta updates to metadata pages and, for each bulk metadata page, a specialized flag, are written to a metadata delta log in association with the unique transaction ID. The specialized flag provides an indication that all delta updates that have occurred previous to the writing of a bulk metadata page are no longer relevant and should be dropped. The raw delta updates to metadata pages and specialized flags are updated in a volatile memory structure. The bulk metadata pages are flushed from the transactional buffer area directly to a metadata store of a storage array in a manner that bypasses the metadata delta log.

15 Claims, 4 Drawing Sheets

(56) References Cited

U.S. PATENT DOCUMENTS

| | | | |
|---|---|---|---|
| 2012/0284287 A1* | 11/2012 | Klinker | G06Q 10/067 |
| | | | 707/754 |
| 2013/0097369 A1* | 4/2013 | Talagala | G06F 12/0804 |
| | | | 711/103 |
| 2016/0378679 A1* | 12/2016 | Cintra | G06F 12/0238 |
| | | | 711/206 |
| 2019/0377647 A1* | 12/2019 | Rao | H04L 67/1095 |
| 2020/0290567 A1* | 9/2020 | Funyak | B60R 25/102 |
| 2021/0019093 A1* | 1/2021 | Karr | G06F 3/0608 |
| 2021/0117328 A1* | 4/2021 | Chen | G06F 3/0656 |

* cited by examiner

EFFICIENT HANDLING OF HIGHLY AMORTIZED METADATA PAGE UPDATES IN STORAGE CLUSTERS WITH DELTA LOG-BASED ARCHITECTURES

BACKGROUND

Clustered storage systems (also referred to herein as "clustered system(s)") employ various techniques and/or methodologies to protect and/or distribute electronic data such as metadata and/or user data. In response to receipt of a write input/output (IO) request for a storage object (e.g., a volume, a logical unit (LU), a file system) from a host computer, a data storage processor (also referred to herein as a "storage node") of a clustered system writes pending changes to metadata and/or user data of the storage object to a journal in local memory before storing the pending changes in a storage array. Once the pending changes to the metadata and/or user data have been written to the journal, the storage node sends an acknowledgement message to the host computer that issued the write IO request. The storage node then stores the pending changes to the metadata and/or user data in the storage array.

SUMMARY

In a clustered system, a storage node can write pending changes to metadata of a storage object (also referred to herein as "delta(s)") to a memory structure in volatile memory and a metadata delta log in persistent memory (also referred to herein collectively as the "delta log infrastructure"). Upon determination that the delta log infrastructure is full or at any other suitable time, the storage node can perform a transaction commit operation to store at least a portion of the deltas written to the delta log infrastructure in a storage array. Before storing the deltas in the storage array, the storage node can aggregate small delta updates corresponding to the same metadata pages and store the aggregated small delta updates in the storage array in an amortized fashion. The storage node can also store metadata pages with large numbers of delta updates and/or newly created metadata pages, which themselves may be highly or completely amortized. However, writing such metadata pages with large numbers of delta updates and/or newly created metadata pages to the delta log infrastructure can be problematic, potentially resulting in an overload of the delta log infrastructure and ultimately reducing its efficiency. Moreover, storing such metadata pages directly in the storage array can also be problematic, due to recent delta updates to the metadata pages potentially being contained in the delta log infrastructure and not being appropriately applied to the metadata pages.

Techniques are disclosed herein for handling highly amortized metadata page updates in storage clusters with delta log-based architectures. With regard to the disclosed techniques, a clustered system can include at least one storage node having processing circuitry, a volatile memory, and a persistent memory. The volatile memory can include a memory structure configured to store and/or aggregate delta updates to metadata pages. The persistent memory can include one or more transactional buffer areas and a metadata delta log. Each transactional buffer area can be configured to store one or more metadata pages containing bulk metadata (also referred to herein as "bulk metadata pages"). As employed herein, the term "bulk metadata pages" corresponds to metadata pages with large numbers of delta updates and/or newly created metadata pages, which may be highly or completely amortized. Each transactional buffer area can have a one-to-one correspondence with one of a plurality of transaction commit threads, each of which can be executed by the processing circuitry. The metadata delta log can be configured to store raw delta updates to metadata pages and maintain the raw delta updates to the metadata pages atomically with a particular transaction commit operation.

During performance of a transaction commit operation, the processing circuitry can write and/or persist, to one of the transactional buffer areas, one or more bulk metadata pages in association with a transaction identifier (ID). Further, the processing circuitry can write and/or persist raw delta updates to metadata pages and, for each bulk metadata page, a specialized flag (also referred to herein as the "drop-delta flag") to the metadata delta log, also in association with a transaction ID. Each transaction ID for raw delta updates to metadata pages can be used to locate a transactional buffer area with the same transaction ID where a bulk update to the metadata pages may be located. Each drop-delta flag is written and/or persisted to the metadata delta log atomically as part of the same transaction commit operation for writing a bulk metadata page. The drop-delta flag for each bulk metadata page can provide an indication that all delta updates that have occurred previous to the writing of the bulk metadata page are no longer relevant and should be dropped. In addition, the processing circuitry can update and/or synchronize the raw delta updates to metadata pages and the drop-delta flags in the volatile memory structure. Having written and/or persisted the raw delta updates and drop-delta flags to the metadata delta log, and updated and/or synchronized the raw delta updates and drop-delta flags in the volatile memory structure, the processing circuitry can flush the bulk metadata pages from the transactional buffer area directly to a metadata page store of a storage array in a manner that bypasses the metadata delta log.

During performance of an operation of recovery from a disaster, data loss, and/or data corruption, the processing circuitry of the storage node can determine, for each transactional buffer area storing bulk metadata pages, whether its associated transaction ID is persisted in the metadata delta log, thereby determining whether a particular transaction commit operation corresponding to the transaction ID was at least partially performed or successfully completed. Having determined that the particular transaction commit operation was at least partially performed or successfully completed, the processing circuitry can flush the bulk metadata pages from the transactional buffer area to the metadata page store of the storage array, thereby recovering the metadata page store to a consistent state. The processing circuitry can also replay the metadata delta log to apply the delta updates written thereto to the volatile memory structure, thereby recovering the volatile memory structure to a consistent state.

By performing an atomic transaction commit operation that includes (i) writing and/or persisting bulk metadata pages to a transactional buffer area of persistent memory, (ii) writing and/or persisting raw delta updates to metadata pages and, for each bulk metadata page, a drop-delta flag to a metadata delta log, (iii) updating and/or synchronizing the raw delta updates and drop-delta flags in a volatile memory structure, and (iv) flushing the bulk metadata pages from the transactional buffer area directly to a metadata page store of a storage array in a manner that bypasses the metadata delta log, overloading of the delta log infrastructure can be avoided while increasing its efficiency.

In certain embodiments, a method of handling metadata page updates in a clustered system includes, during performance of a transaction commit operation by a storage node, writing, in association with a unique transaction identifier (ID), one or more bulk metadata pages to a transactional buffer area of a persistent memory, writing, in association with the unique transaction ID, raw delta updates to metadata pages to a metadata delta log in the persistent memory, updating the raw delta updates to metadata pages in a volatile memory structure, and flushing the bulk metadata pages from the transactional buffer area directly to a metadata page store of a storage array in a manner that bypasses the metadata delta log.

In certain arrangements, the method further includes writing, for each bulk metadata page and in association with the unique transaction ID, a specialized flag to the metadata delta log in the persistent memory. The specialized flag provides an indication that all delta updates that have occurred previous to the writing of the bulk metadata page to the transactional buffer area are to be dropped.

In certain arrangements, the transactional buffer area has an associated header, and the method further includes writing at least the unique transaction ID to the header of the transactional buffer area. The unique transaction ID corresponds to the transaction commit operation.

In certain arrangements, the metadata delta log includes a plurality of transaction commit entries, and the raw delta updates are contained in a respective transaction commit entry from among the plurality of transaction commit entries. The respective transaction commit entry has an associated header, and the method further includes writing at least the unique transaction ID to the header of the respective transaction commit entry.

In certain arrangements, the method further includes, during performance of a recovery operation by the storage node, determining whether the unique transaction ID associated with the transactional buffer area is persisted in the metadata delta log.

In certain arrangements, the method further includes, having determined that the unique transaction ID associated with the transactional buffer area is persisted in the metadata delta log, flushing the bulk metadata pages from the transactional buffer area to the metadata page store of the storage array, thereby recovering the metadata page store to a consistent state.

In certain arrangements, the method further includes replaying the metadata delta log to apply delta updates written thereto to the volatile memory structure, thereby recovering the volatile memory structure to a consistent state.

In certain embodiments, a storage node in a clustered system includes a volatile memory, a persistent memory, a program memory, and processing circuitry configured to execute program instructions out of the program memory. During performance of a transaction commit operation, the processing circuitry executes the program instructions out of the program memory to write, in association with a unique transaction identifier (ID), one or more bulk metadata pages to a transactional buffer area of a persistent memory, to write, in association with the unique transaction ID, raw delta updates to metadata pages to a metadata delta log in the persistent memory, to update the raw delta updates to metadata pages in a volatile memory structure, and to flush the bulk metadata pages from the transactional buffer area directly to a metadata page store of a storage array in a manner that bypasses the metadata delta log.

In certain arrangements, the processing circuitry is further configured to execute the program instructions out of the program memory to write, for each bulk metadata page and in association with the unique transaction ID, a specialized flag to the metadata delta log in the persistent memory. The specialized flag provides an indication that all delta updates that have occurred previous to the writing of the bulk metadata page to the transactional buffer area are to be dropped.

In certain arrangements, the transactional buffer area has an associated header, and the processing circuitry is further configured to execute the program instructions out of the program memory to write at least the unique transaction ID to the header of the transactional buffer area, the unique transaction ID corresponding to the transaction commit operation.

In certain arrangements, the metadata delta log includes a plurality of transaction commit entries, and the raw delta updates are contained in a respective transaction commit entry from among the plurality of transaction commit entries. The respective transaction commit entry has an associated header, and the processing circuitry is further configured to execute the program instructions out of the program memory to write at least the unique transaction ID to the header of the respective transaction commit entry.

In certain arrangements, the processing circuitry is further configured to execute the program instructions out of the program memory, during performance of a recovery operation by the storage node, to determine whether the unique transaction ID associated with the transactional buffer area is persisted in the metadata delta log.

In certain arrangements, the processing circuitry is further configured to execute the program instructions out of the program memory, having determined that the unique transaction ID associated with the transactional buffer area is persisted in the metadata delta log, to flush the bulk metadata pages from the transactional buffer area to the metadata page store of the storage array, thereby recovering the metadata page store to a consistent state.

In certain arrangements, the processing circuitry is further configured to execute the program instructions out of the program memory to replay the metadata delta log to apply delta updates written thereto to the volatile memory structure, thereby recovering the volatile memory structure to a consistent state.

In certain embodiments, a computer program product includes a set of non-transitory, computer-readable media having instructions that, when executed by processing circuitry of a storage node in a clustered system, cause the processing circuitry to perform a method that includes, during performance of a transaction commit operation by the storage node, writing, in association with a unique transaction identifier (ID), one or more bulk metadata pages to a transactional buffer area of a persistent memory, writing, in association with the unique transaction ID, raw delta updates to metadata pages to a metadata delta log in the persistent memory, updating the raw delta updates to metadata pages in a volatile memory structure, and flushing the bulk metadata pages from the transactional buffer area directly to a metadata page store of a storage array in a manner that bypasses the metadata delta log.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for handling highly amortized metadata page updates in storage clusters with delta log-based architectures. During performance of a transaction commit operation, one or more bulk metadata pages can be written and/or persisted to a transactional buffer area of a persistent memory in association with a transaction identifier (ID). Further, raw delta updates to metadata pages and, for each bulk metadata page, a specialized flag (drop-delta flag) can be written and/or persisted to a metadata delta log, also in association with a transaction ID. The raw delta updates to metadata pages and drop-delta flags can also be updated and/or synchronized in a volatile memory structure. Having written and/or persisted the raw delta updates to metadata pages and drop-delta flags to the metadata delta log, and updated and/or synchronized the raw delta updates and drop-delta flags in the volatile memory structure, the bulk metadata pages can be flushed from the transactional buffer area directly to a metadata page store of a storage array in a manner that bypasses the metadata delta log, thereby avoiding overloading of the delta log infrastructure and increasing its efficiency.

Figure 1:
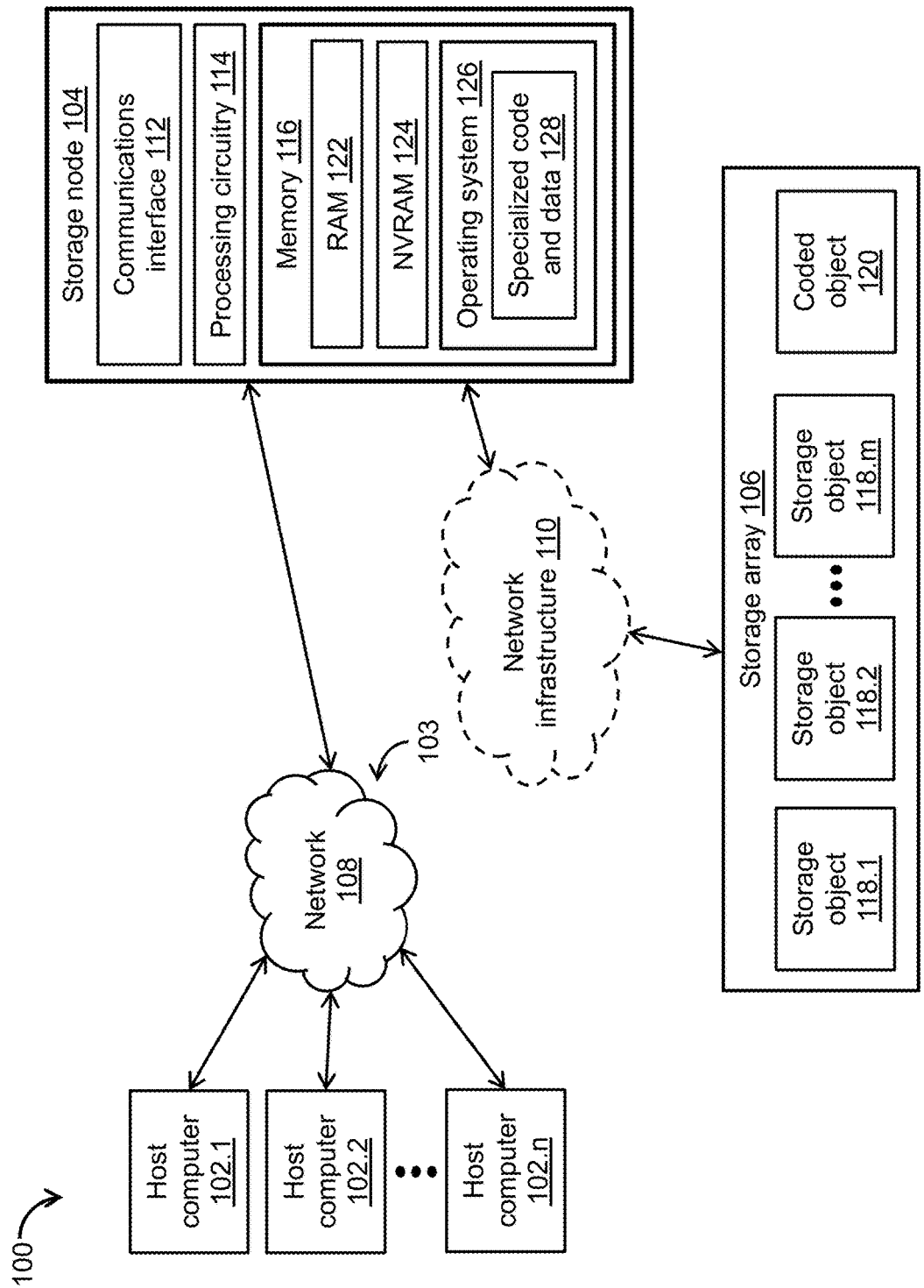
FIG. 1 is a block diagram of an exemplary data storage environment, in which techniques can be practiced for handling highly amortized metadata page updates in storage clusters with delta log-based architectures.

FIG. 1 depicts an illustrative embodiment of an exemplary data storage environment 100, in which techniques can be practiced for handling highly amortized metadata page updates in storage clusters with delta log-based architectures. As shown in FIG. 1, the data storage environment 100 can include a plurality of host computers 102.1, 102.2, ..., 102.n, at least one data storage processor 104 (also referred to herein as a "storage node"), a storage array 106, and a communications medium 103 that includes at least one network 108. For example, each of the plurality of host computers 102.1, ..., 102.n can be configured as a web server computer, a file server computer, an email server computer, an enterprise server computer, and/or any other suitable client/server computer or computerized device. The plurality of host computers 102.1, ..., 102.n can be configured to provide, over the network 108, storage input/output (IO) requests (e.g., small computer system interface (SCSI) commands, network file system (NFS) commands) to the storage node 104. Such storage IO requests (e.g., write IO requests, read IO requests) can direct the storage node 104 to write or read data blocks, data pages, data files, or any other suitable data elements to/from volumes (VOLs), logical units (LUs), file systems, and/or any other suitable storage objects, such as a plurality of storage objects 118.1, 118.2, ..., 118.m maintained in the storage array 106.

The communications medium 103 can be configured to interconnect the plurality of host computers 102.1, ..., 102.n with the storage node 104 to enable them to communicate and exchange data and/or control signaling. As shown in FIG. 1, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic devices and cabling, wireless devices, and so on, or any suitable combination thereof. The communications medium 103 can be further configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable communications.

The storage node 104 can be connected directly to the storage array 106 or by an optional network infrastructure 110, which can include an Ethernet (e.g., layer 2 or layer 3) network, a fiber channel network, an InfiniBand network, and/or any other suitable network(s). As shown in FIG. 1, the storage node 104 can include a communications interface 112, processing circuitry 114, and a memory 116. The communications interface 112 can include one or more of an InfiniBand interface, an Ethernet interface, an IEEE 802.11x (WiFi) interface, a Bluetooth interface, and/or any other suitable communications interface. The communications interface 112 can further include SCSI target adapters, network interface adapters, and/or any other suitable adapters for converting electronic, optical, and/or wireless signals received over the network 108 to a form suitable for use by the processing circuitry 114.

The memory 116 can include volatile memory such as a random-access memory (RAM) 122 or any other suitable volatile memory, as well as persistent memory such as a nonvolatile random-access memory (NVRAM) 124 or any other suitable persistent memory. The memory 116 can also store a variety of software constructs realized in the form of specialized code and data 128 (e.g., program instructions) that can be executed by the processing circuitry 114 to carry out the techniques and/or methods disclosed herein. The memory 116 can further include an operating system 126, such as a Linux operating system (OS), a Unix OS, a Windows OS, or any other suitable operating system.

The processing circuitry 114 can include one or more physical storage processors and/or engines configured to execute the specialized code and data 128, as well as data movers, director boards, blades, IO modules, storage drive controllers, switches, and/or any other suitable computer hardware or combination thereof. For example, the processing circuitry 114 can execute the specialized code and data 128 as program instructions out of the memory 116, process storage IO requests (e.g., write IO requests, read IO requests) issued by the respective host computers 102.1, ..., 102.n, and/or store metadata and/or user data on the storage array 106 in the data storage environment 100, which can be a clustered RAID environment.

As shown in FIG. 1, the storage array 106 can include a coded object 120, which can be configured to store coded data for use in regenerating lost or corrupted data on one or more of the plurality of storage objects 118.1, 118.2, ..., 118.m. In certain implementations, the coded object 120 can be stored on a hard disk drive (HDD) configured to store parity data in a RAID array. Alternatively (or in addition), the storage objects 118.1, 118.2, ..., 118.m and the coded object 120 can be stored on one or more HDDs, solid state drives (SSDs), flash devices, and/or any other suitable storage device(s). It is noted that the storage node 104 can include a keyboard, a mouse, and/or any other suitable IO device(s), an uninterruptable power supply (UPS), and/or any other suitable storage node component(s).

In the context of the processing circuitry 114 being implemented using one or more processors executing the specialized code and data 128, a computer program product can be configured to deliver all or a portion of the specialized code and data 128 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

Figure 2:
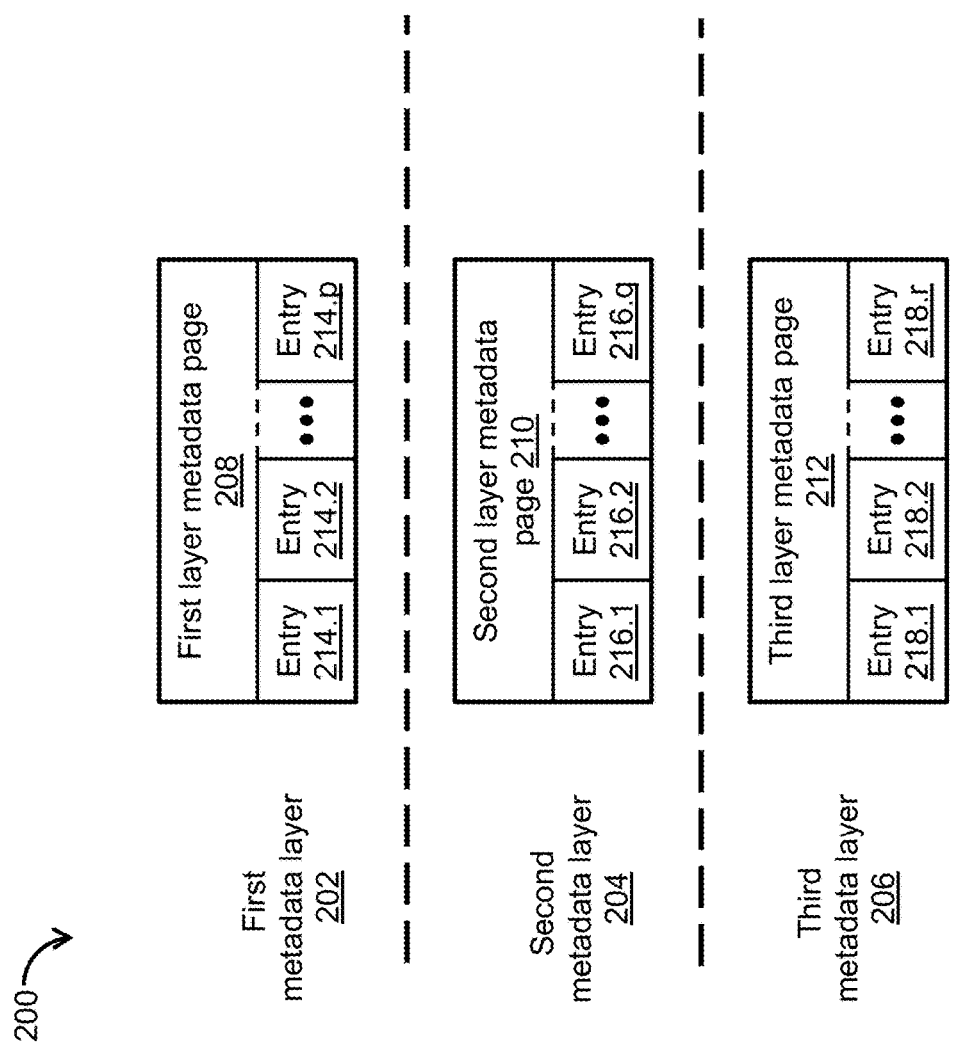
FIG. 2 is a block diagram of exemplary multiple layers of metadata pages, which can be maintained by a storage node in the data storage environment of FIG. 1.

FIG. 2 depicts an exemplary metadata structure 200 that can be maintained by the storage node 104 of FIG. 1. It is noted that any other suitable metadata structure can also be maintained by the storage node 104, using the techniques and/or methods disclosed herein. As shown in FIG. 2, the metadata structure 200 can include multiple layers of metadata, namely, a first metadata layer 202, a second metadata layer 204, and a third metadata layer 206. The first metadata layer 202 can include at least one first layer metadata page 208. Likewise, the second metadata layer 204 can include at least one second layer metadata page 210, and the third metadata layer 206 can include at least one third layer metadata page 212. It is noted that the first metadata layer 202, the second metadata layer 204, and the third metadata layer 206 are depicted in FIG. 2 as containing metadata "pages" for purposes of illustration only, and that any other suitable metadata elements can be employed.

As further shown in FIG. 2, the first layer metadata page 208 can include a plurality of entries 214.1, 214.2, ..., 214.p. Likewise, the second layer metadata page 210 can include a plurality of entries 216.1, 216.2, ..., 216.q, and the third layer metadata page 212 can include a plurality of entries 218.1, 218.2, ..., 218.r. The plurality of entries 214.1, 214.2, ..., 214.p included in the first layer metadata page 208 can be configured to map and/or point to at least some of the plurality of entries 216.1, 216.2, ..., 216.q included the second layer metadata page(s) 210. For example, the first metadata layer 202 can represent various ranges of logical block addresses (LBAs). Further, each of the plurality of entries 214.1, 214.2, ..., 214.p of the first layer metadata page 208 can be associated with a particular LBA range. In certain implementations, the first metadata layer 202 can be organized as a "tree" data structure (or any other suitable data structure), in which each "leaf" of the tree data structure corresponds to a particular LBA range. As a result, the first layer metadata page 208 can maintain a particular LBA mapping to the second layer metadata page(s) 210.

The plurality of entries 216.1, 216.2, ..., 216.q included in the second layer metadata page 210 can be configured to map and/or point to at least some of the plurality of entries 218.1, 218.2, ..., 218.r included the third layer metadata page(s) 212. In certain implementations, the second metadata layer 204 can be configured to isolate logical addresses of metadata pages in the first metadata layer 202 from actual physical storage locations of the metadata page. Further, the second layer metadata page 210 can be configured to encapsulate a physical storage location of a metadata page to allow for its relocation without having to update first layer metadata page 208. In this way, the second metadata layer 204 can decouple an LBA space from a corresponding physical address space.

The plurality of entries 218.1, 218.2, ..., 218.q included in the third layer metadata page 212 can be configured to store metadata pages. As such, the third metadata layer 206 can be configured to describe actual physical storage locations of metadata pages within the storage array 106. In certain implementations, each third layer metadata page (such as the third layer metadata page 212; see FIG. 2) can correspond to a metadata page having a predefined amount of storage capacity (e.g., 4K (kilobytes), 8K) for bulk metadata (also referred to herein as a "bulk metadata page(s)"). Such a bulk metadata page, which may be highly or completely amortized, can be stored in the storage array 106 using the techniques and/or methods described herein.

During performance of a transaction commit operation, the processing circuitry 114 of the storage node 104 can write and/or persist, to a transactional buffer area of a persistent memory (e.g., the NVRAM 124; see FIG. 1), one or more bulk metadata pages in association with a transaction identifier (ID). As employed herein, the term "bulk metadata page(s)" corresponds to metadata pages with large numbers of delta updates and/or newly created metadata pages, which may be highly or completely amortized. Further, each transactional buffer area can have a one-to-one correspondence with one of a plurality of transaction commit threads, each of which can be executed by the processing circuitry 114. The processing circuitry 114 can also write and/or persist, to a metadata delta log in the NVRAM 124, raw delta updates to metadata pages and, for each bulk metadata page, a specialized flag (drop-delta flag), also in association with a transaction ID. Each transaction ID for raw delta updates to metadata pages can be used to locate a transactional buffer area with the same transaction ID where a bulk update to the metadata pages may be located. Each drop-delta flag is written and/or persisted to the metadata delta log atomically as part of the same transaction commit operation for writing a bulk metadata page. The drop-delta flag for each bulk metadata page can provide an indication that all delta updates that have occurred previous to the writing of the bulk metadata page are no longer relevant and should be dropped. In addition, the processing circuitry 114 can update and/or synchronize the raw delta updates to metadata pages and drop-delta flags in a memory structure of a volatile memory (e.g., the RAM 122; see FIG. 1). Having written and/or persisted the raw delta updates and drop-delta flags to the metadata delta log, and updated and/or synchronized the raw delta updates and drop-delta flags in the volatile memory structure, the processing circuitry 114 can flush the bulk metadata pages from the transactional buffer area directly to a metadata page store of the storage array 106 in a manner that bypasses the metadata delta log.

Moreover, during performance of an operation of recovery from a disaster, data loss, and/or data corruption, the processing circuitry 114 of the storage node 104 can determine, for each transactional buffer area storing bulk metadata pages, whether the transaction ID associated with the transactional buffer area is persisted in the metadata delta log, thereby determining whether a particular transaction commit operation corresponding to the transaction ID was at least partially performed and/or successfully completed. Having determined that the particular transaction commit operation was at least partially performed and/or successfully completed, the processing circuitry 114 can flush the bulk metadata pages from the transactional buffer area to the metadata page store of the storage array 106, thereby recovering the metadata page store to a consistent state. The processing circuitry 114 can also replay the metadata delta log to apply the delta updates written thereto to the volatile memory structure, thereby recovering the volatile memory structure to a consistent state.

By performing an atomic transaction commit operation that includes (i) writing and/or persisting bulk metadata pages to a transactional buffer area of a persistent memory, (ii) writing and/or persisting raw delta updates to metadata pages and, for each bulk metadata page, a drop-delta flag to a metadata delta log, (iii) updating and/or synchronizing the raw delta updates and drop-delta flags in a volatile memory structure, and (iv) flushing the bulk metadata pages from the transactional buffer area directly to a metadata page store of a storage array in a manner that bypasses the metadata delta log, overloading of the delta log infrastructure can be avoided while increasing its efficiency.

Figure 3:
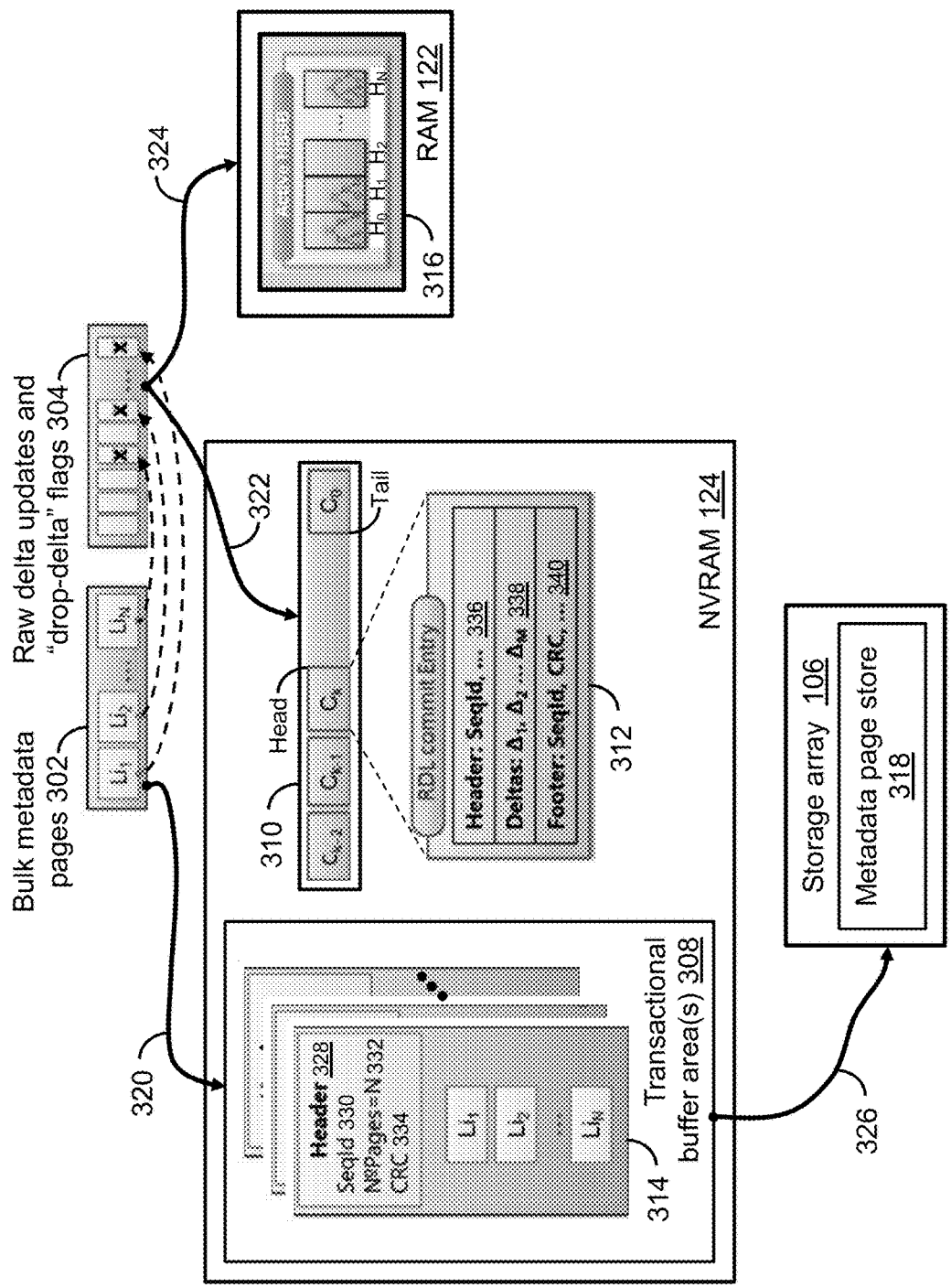
FIG. 3 is a block diagram of volatile memory components, persistent memory components, and storage array components of a storage node in the data storage environment of FIG. 1.

The disclosed techniques for handling highly amortized metadata page updates in storage clusters with delta log-based architectures will be further understood with reference to the following illustrative examples and FIGS. 1 and 3. FIG. 3 depicts several exemplary components of the storage node 104 of FIG. 1, namely, the RAM 122, the NVRAM 124, and the storage array 106. As shown in FIG. 3, the RAM 122 can be configured to include a volatile memory structure 316, which has a set of data containers $H_0$, $H_1$, $H_2$, ..., $H_N$ for storing delta updates to metadata pages. In certain implementations, each of the data containers $H_0$, $H_1$, $H_2$, ..., $H_N$ can be configured as a tree data structure such as a binary tree, or any other suitable memory structure. The NVRAM 124 can be configured to include one or more transactional buffer areas 308. As described herein, each transactional buffer area can have a one-to-one correspondence with one of a plurality of transaction commit threads, each of which can be executed by the processing circuitry 114. In certain implementations, the number of transaction commit threads executable by the processing circuitry 114 can be one hundred (100), or any other suitable number. The NVRAM 124 can therefore include up to one hundred (100) transactional buffer areas 308, such as a transactional buffer area 314. As further shown in FIG. 3, the transactional buffer area 314 can be configured to store one or more bulk metadata pages $Li_1$, $Li_2$, ..., $Li_N$. In certain implementations, the transactional buffer area 314 can be configured to include a header 328 that contains a transaction ID ("SeqId") 330, an indication ("N$^o$Pages") 332 of the number of bulk metadata pages $Li_1$, $Li_2$, ..., $Li_N$ (e.g., N=100 or any other suitable number) stored in the transactional buffer area 314, as well as a cyclic redundancy code or checksum ("CRC") 334.

The NVRAM 124 can be further configured to include a metadata delta log 310 for storing a plurality of transaction commit entries $C_{k-2}$, $C_{k-1}$, $C_k$, $C_0$, each of which can contain raw delta updates to metadata pages and, for each bulk metadata page $Li_1$, $Li_2$, ..., $Li_N$, a drop-delta flag. In certain implementations, the metadata delta log 310 can be configured as a ring buffer, in which a particular transaction commit entry $C_{k-2}$, $C_{k-1}$, $C_k$, ..., or $C_0$ can be added to a "head" of the ring buffer and subsequently released or deleted from a "tail" of the ring buffer. In certain implementations, each of the transaction commit entries $C_{k-2}$, $C_{k-1}$, $C_k$, ..., $C_0$ (such as the transaction commit entry, $C_k$ 312) can be configured to include a header 336 that contains at least a transaction ID ("SeqId"), a footer 340 that contains at least the transaction ID ("SeqId") and a CRC, as well as one or more deltas $\Delta_1$, $\Delta_2$, ..., $\Delta M$ 338 corresponding to raw delta updates to metadata pages. The storage array 106 can be configured to include a metadata page store 318.

In a first example, the processing circuitry 114 of the storage node 104 performs a transaction commit operation to commit bulk metadata pages 302 to storage in the metadata page store 318 of the storage array 106. In this first example, the bulk metadata pages 302 correspond to the bulk metadata pages $Li_1$, $Li_2$, ..., $Li_N$, and raw delta updates and drop-delta flags 304 include raw delta updates to metadata pages and, for each bulk metadata page $Li_1$, $Li_2$, ..., $Li_N$, a drop-delta flag (marked by a cross, X).

During performance of the transaction commit operation, the processing circuitry 114 of the storage node 104 executes a transaction commit thread, writing and/or persisting (as illustrated by an arrow 320) the bulk metadata pages $Li_1$, $Li_2$, ..., $Li_N$ in the transactional buffer area 314, and updating the header 328 of the transactional buffer area 314 to include the transaction ID ("SeqId") 330, the indication ("N$^o$Pages") 332 of the number, N, of bulk metadata pages $Li_1$, $Li_2$, ..., $Li_N$, and the CRC 334. As described herein, the transactional buffer area 314 has a one-to-one correspondence with the transaction commit thread. The processing circuitry 114 further executes the transaction commit thread to write and/or persist (as illustrated by an arrow 322) one or more transaction commit entries (such as the transaction commit entries $C_{k-2}$, $C_{k-1}$, $C_k$, $C_0$) containing raw delta updates to metadata pages and, for each bulk metadata page $Li_1$, $Li_2$, ..., $Li_N$, a drop-delta flag to the metadata delta log 310, and to update the headers and footers included in the transaction commit entries. For example, the processing circuitry 114 can execute the transaction commit thread to write and/or persist the transaction commit entry, $C_k$ 312 to the metadata delta log 310, to update the header 336 to include the transaction ID ("SeqId") 330, and to update the footer 340 to include at least the transaction ID ("SeqId") and the CRC.

It is noted that the deltas $\Delta_1$, $\Delta_2$, ..., $\Delta_M$ 338 contained in the transaction commit entry $C_k$ 312 of the metadata delta log 310 can correspond to raw delta updates to metadata pages. It is further noted that the transaction commit entry $C_k$ 312 can include, for each metadata page $Li_1$, $Li_2$, ..., $Li_N$, a drop-delta flag. While building an up-to-date metadata page, e.g., during a cache miss or de-stage operation, the drop-delta flag can provide an indication that all delta updates that have occurred previous to the writing of the metadata page are no longer relevant and should be dropped.

Having written and/or persisted one or more of the transaction commit entries (e.g., the transaction commit entry, $C_k$ 312) to the metadata delta log 310, the processing circuitry 114 of the storage node 104 executes the transaction commit thread to update and/or synchronize (as illustrated by an arrow 324) the raw delta updates to metadata pages and the drop-delta flags in the volatile memory structure 316. In certain implementations, the raw delta updates can be converted into a metadata update "tuple" (e.g., Li, Ei, T, V) including multiple entries, such as (i) a logical index, Li, of a corresponding metadata page, (ii) an offset, Ei, within the metadata page, (iii) a record or delta type, T, defining a size of the delta update, (iv) a payload or value, V, of the delta update, and/or any other suitable entry or entries. In such implementations, the designations $Li_1$, $Li_2, \ldots, Li_N$ for the bulk metadata pages stored in the transactional buffer area 314 can correspond to the logical indices of the respective bulk metadata pages. Further, the designations $H_0, H_1, H_2, \ldots, H_N$ for the data containers of the volatile memory structure 316 can correspond to hash values obtained by applying a hash function to the respective logical indices, $Li_1, Li_2, \ldots, Li_N$, of the bulk metadata pages. In this way, each of the data containers, $H_0, H_1, H_2, \ldots, H_N$, for storing delta updates to metadata pages can be associated with a particular metadata page, based at least in part on the logical index of the particular metadata page.

Once one or more of the transaction commit entries (e.g., the transaction commit entry, $C_k$ 312) have been written and/or persisted to the metadata delta log 310, and the raw delta updates to metadata pages and drop-delta flags have been updated and/or synchronized in the volatile memory structure 316, the processing circuitry 114 of the storage node 104 executes the transaction commit thread to flush (as illustrated by an arrow 326) the bulk metadata pages, $Li_1, Li_2, \ldots, Li_N$, from the transactional buffer area 314 directly to the metadata page store 318 of the storage array 106 in a manner that bypasses the metadata delta log 310, thereby avoiding overloading of the delta log infrastructure and increasing its efficiency.

In a second example, the processing circuitry 114 of the storage node 104 performs an operation of recovery from a disaster, data loss, and/or data corruption. In this second example, such a disaster, data loss, and/or data corruption may result in the set of data containers $H_0, H_1, H_2, \ldots, H_N$ of the volatile memory structure 316 being cleared of delta updates to metadata pages, and/or the bulk metadata pages, $Li_1, Li_2, \ldots, Li_N$, not being flushed to the metadata page store 318 of the storage array 106. During performance of the recovery operation, the processing circuitry 114 determines, for each transactional buffer area 308 storing bulk metadata pages, whether the transaction ID associated with the transactional buffer area is persisted in the metadata delta log 310, thereby determining whether a particular transaction commit operation corresponding to the transaction ID was at least partially performed and/or successfully completed. For example, the processing circuitry 114 can determine, for the transactional buffer area 314 storing the bulk metadata pages, $Li_1, Li_2, \ldots, Li_N$, whether the transaction ID ("SeqId") 330 is persisted in the metadata delta log 310 (e.g., near the "head") in association with the transaction commit entry, $C_k$ 312 (e.g., in the header 336 and/or the footer 340), and/or whether the transaction commit operation was torn or interrupted (e.g., whether any errors occurred while performing the transaction commit operation).

Having determined that the transaction commit operation corresponding to the transaction ID ("SeqId") 330 was at least partially performed and/or successfully completed, and was not torn or interrupted, the processing circuitry 114 can flush the bulk metadata pages, $Li_1, Li_2, \ldots, Li_N$, from the transactional buffer area 314 to the metadata page store 318 of the storage array 106, thereby recovering the metadata page store 318 to a consistent state. The processing circuitry 114 can also address any cases in which other transaction commit operation(s) may have been torn or interrupted, using a record of transactions maintained in the metadata delta log 310 to roll back the storage node 104 to a previous point-in-time (or roll the storage node 104 forward in time). In addition, the processing circuitry 114 can replay the metadata delta log 310 to apply delta updates written thereto to the volatile memory structure 316, thereby recovering the volatile memory structure 316 to a consistent state.

Figure 4:
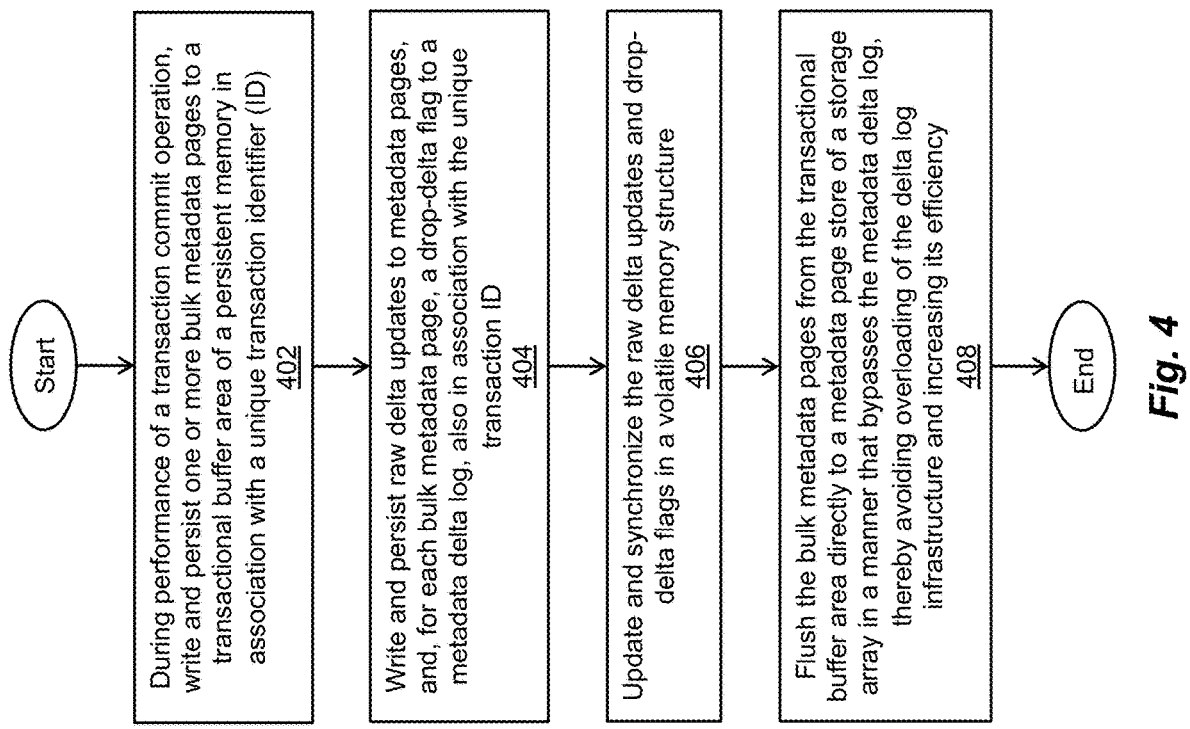
FIG. 4 is a flow diagram of an exemplary method of handling highly amortized metadata page updates in storage clusters with delta log-based architectures.

An exemplary method of handling highly amortized metadata page updates in storage clusters with delta log-based architectures is described below with reference to FIG. 4. This exemplary method of handling highly amortized metadata page updates can be performed in a clustered system by at least one storage node communicably connected to a storage array. As depicted in block 402, during performance of a transaction commit operation, one or more bulk metadata pages are written and persisted to a transactional buffer area of a persistent memory in association with a unique transaction identifier (ID). As depicted in block 404, raw delta updates to metadata pages, and, for each bulk metadata page, a drop-delta flag are written and persisted to a metadata delta log, also in association with the unique transaction ID. As depicted in block 406, the raw delta updates and drop-delta flags are updated and synchronized in a volatile memory structure. As depicted in block 408, the bulk metadata pages are flushed from the transactional buffer area directly to a metadata page store of a storage array in a manner that bypasses the metadata delta log, thereby avoiding overloading of the delta log infrastructure and increasing its efficiency.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of handling metadata page updates in a clustered system, the clustered system including a storage node communicably connected to a storage array, the method comprising:
   during performance of a transaction commit operation by the storage node:
      writing, in association with a unique transaction identifier (ID), one or more bulk metadata pages to a transactional buffer area of a persistent memory;
      writing, in association with the unique transaction ID, raw delta updates to metadata pages to a metadata delta log in the persistent memory; and
      updating the raw delta updates to metadata pages in a volatile memory structure; and
   during performance of a recovery operation by the storage node:
      determining whether the unique transaction ID associated with the transactional buffer area is persisted in the metadata delta log; and
      having determined that the unique transaction ID associated with the transactional buffer area is persisted in the metadata delta log, flushing the bulk metadata pages from the transactional buffer area directly to a metadata page store of the storage array in a manner that bypasses the metadata delta log, thereby recovering the metadata page store to a consistent state.

2. The method of claim 1 further comprising:
   writing, for each bulk metadata page and in association with the unique transaction ID, a specialized flag to the metadata delta log in the persistent memory, the specialized flag providing an indication that all delta updates that have occurred previous to the writing of the bulk metadata page to the transactional buffer area are to be dropped.

3. The method of claim 1 wherein the transactional buffer area has an associated header, and wherein the method further comprises:
   writing at least the unique transaction ID to the header of the transactional buffer area, the unique transaction ID corresponding to the transaction commit operation.

4. The method of claim 1 wherein the metadata delta log includes a plurality of transaction commit entries, wherein the raw delta updates are contained in a respective transaction commit entry from among the plurality of transaction commit entries, wherein the respective transaction commit entry has an associated header, and wherein the method further comprises:
   writing at least the unique transaction ID to the header of the respective transaction commit entry.

5. The method of claim 1 further comprising:
   replaying the metadata delta log to apply delta updates written thereto to the volatile memory structure, thereby recovering the volatile memory structure to a consistent state.

6. A storage node in a clustered system, the storage node comprising:
   a volatile memory;
   a persistent memory;
   a program memory; and
   processing circuitry configured to execute program instructions out of the program memory to:
      during performance of a transaction commit operation:
         write, in association with a unique transaction identifier (ID), one or more bulk metadata pages to a transactional buffer area of a persistent memory;
         write, in association with the unique transaction ID, raw delta updates to metadata pages to a metadata delta log in the persistent memory; and
         update the raw delta updates to metadata pages in a volatile memory structure; and
      during performance of a recovery operation by the storage node, determine whether the unique transaction ID associated with the transactional buffer area is persisted in the metadata delta log; and
      having determined that the unique transaction ID associated with the transactional buffer area is persisted in the metadata delta log, flush the bulk metadata pages from the transactional buffer area directly to a metadata page store of a storage array in a manner that bypasses the metadata delta log, thereby recovering the metadata page store to a consistent state.

7. The storage node of claim 6 further comprising:
   wherein the processing circuitry is further configured to execute the program instructions out of the program memory to write, for each bulk metadata page and in association with the unique transaction ID, a specialized flag to the metadata delta log in the persistent memory, the specialized flag providing an indication that all delta updates that have occurred previous to the writing of the bulk metadata page to the transactional buffer area are to be dropped.

8. The storage node of claim 6 wherein the transactional buffer area has an associated header, and wherein the processing circuitry is further configured to execute the program instructions out of the program memory to write at least the unique transaction ID to the header of the transactional buffer area, the unique transaction ID corresponding to the transaction commit operation.

9. The storage node of claim 6 wherein the metadata delta log includes a plurality of transaction commit entries, wherein the raw delta updates are contained in a respective transaction commit entry from among the plurality of transaction commit entries, wherein the respective transaction commit entry has an associated header, and wherein the processing circuitry is further configured to execute the program instructions out of the program memory to write at least the unique transaction ID to the header of the respective transaction commit entry.

10. The storage node of claim 6 wherein the processing circuitry is further configured to execute the program instructions out of the program memory to:
   replay the metadata delta log to apply delta updates written thereto to the volatile memory structure, thereby recovering the volatile memory structure to a consistent state.

11. A computer program product including a set of non-transitory, computer-readable media having instructions that, when executed by processing circuitry of a storage node in a clustered system, cause the processing circuitry to perform a method comprising:
   during performance of a transaction commit operation by the storage node:
      writing, in association with a unique transaction identifier (ID), one or more bulk metadata pages to a transactional buffer area of a persistent memory;
      writing, in association with the unique transaction ID, raw delta updates to metadata pages to a metadata delta log in the persistent memory; and
      updating the raw delta updates to metadata pages in a volatile memory structure; and
   during performance of a recovery operation by the storage node:
      determining whether the unique transaction ID associated with the transactional buffer area is persisted in the metadata delta log; and
      having determined that the unique transaction ID associated with the transactional buffer area is persisted in the metadata delta log, flushing the bulk metadata pages from the transactional buffer area directly to a metadata page store of a storage array in a manner that bypasses the metadata delta log, thereby recovering the metadata page store to a consistent state.

12. The computer program product of claim 11 wherein the method further comprises:
   writing, for each bulk metadata page and in association with the unique transaction ID, a specialized flag to the metadata delta log in the persistent memory, the specialized flag providing an indication that all delta updates that have occurred previous to the writing of the bulk metadata page to the transactional buffer area are to be dropped.

13. The computer program product of claim 11 wherein the transactional buffer area has an associated header, and wherein the method further comprises:
   writing at least the unique transaction ID to the header of the transactional buffer area, the unique transaction ID corresponding to the transaction commit operation.

14. The computer program product of claim 11 wherein the metadata delta log includes a plurality of transaction commit entries, wherein the raw delta updates are contained in a respective transaction commit entry from among the plurality of transaction commit entries, wherein the respective transaction commit entry has an associated header, and wherein the method further comprises:
   writing at least the unique transaction ID to the header of the respective transaction commit entry.

15. The computer program product of claim 11 wherein the method further comprises:
   replaying the metadata delta log to apply delta updates written thereto to the volatile memory structure, thereby recovering the volatile memory structure to a consistent state.

* * * * *